United States Patent
Akers

(10) Patent No.: US 9,499,418 B2
(45) Date of Patent: Nov. 22, 2016

(54) METHOD OF PRODUCTION OF FRESH WATER

(71) Applicant: Jeffrey W. Akers, Columbia, MO (US)

(72) Inventor: Jeffrey W. Akers, Columbia, MO (US)

( * ) Notice: Subject to any disclaimer, the term of this patent is extended or adjusted under 35 U.S.C. 154(b) by 0 days.

(21) Appl. No.: 14/675,269

(22) Filed: Mar. 31, 2015

(65) Prior Publication Data

US 2015/0274552 A1 Oct. 1, 2015

Related U.S. Application Data

(60) Provisional application No. 61/973,056, filed on Mar. 31, 2014, provisional application No. 62/009,625, filed on Jun. 9, 2014.

(51) Int. Cl.
| | |
|---|---|
| C02F 1/44 | (2006.01) |
| C02F 1/461 | (2006.01) |
| C02F 103/08 | (2006.01) |
| C02F 103/36 | (2006.01) |
| H01M 8/06 | (2016.01) |

(52) U.S. Cl.
CPC ........... *C02F 1/441* (2013.01); *C02F 1/46176* (2013.01); *C02F 2103/08* (2013.01); *C02F 2103/365* (2013.01); *H01M 8/0606* (2013.01)

(58) Field of Classification Search
CPC ............... C02F 1/441; C02F 1/46176; C02F 2103/365; C02F 2103/08; C02F 1/4604; C02F 1/46114; C02F 1/461; C02F 2201/46115; H01M 8/0606; H01M 8/0656; B01D 35/06; B01D 57/02; C01B 3/042
See application file for complete search history.

(56) References Cited

U.S. PATENT DOCUMENTS

| | | | |
|---|---|---|---|
| 98,442 A | 12/1869 | Steiner | 48/116 |
| 1,059,818 A | 4/1913 | Bergius | 426/633 |
| 2,623,812 A | 12/1952 | Eborall et al. | 423/658 |
| 3,348,919 A | 10/1967 | Shumway | 423/657 |
| 3,942,511 A | 3/1976 | Black et al. | 126/263.05 |
| 3,957,483 A | 5/1976 | Suzuki | 427/180 |
| 3,993,577 A | 11/1976 | Black et al. | 252/188.25 |
| 4,017,414 A | 4/1977 | Black et al. | 252/188.25 |
| 4,072,514 A | 2/1978 | Suzuki | 420/402 |
| 4,118,299 A * | 10/1978 | Maget | C02F 1/4604 204/265 |
| 4,200,460 A | 4/1980 | Grossman et al. | 420/422 |
| 4,264,362 A | 4/1981 | Sergev et al. | 75/243 |
| 4,312,669 A | 1/1982 | Boffito et al. | 420/422 |
| 4,405,487 A | 9/1983 | Harrah et al. | 252/194 |
| 5,494,538 A | 2/1996 | Kirillov et al. | 148/420 |
| 5,888,925 A | 3/1999 | Smith et al. | 502/400 |
| 6,018,091 A | 1/2000 | Thomas | 588/316 |
| 6,113,806 A | 9/2000 | Thomas | 252/188.25 |
| 6,117,206 A | 9/2000 | Thomas | 75/255 |

(Continued)

*Primary Examiner* — David C Mellon
*Assistant Examiner* — Liam A Royce
(74) *Attorney, Agent, or Firm* — Jonathan A. Bay

(57) ABSTRACT

Salt rich undrinkable water can be freshened by, and by adjustment of various factors can indeed be freshened to the point of being drinkable by, introducing galvanic couple particles in the salt rich undrinkable water within inside a main processor, controlling pressure inside the main processor to build substantial internal pressurization due to the reaction of the salt rich undrinkable water with the galvanic couple particles into a metallic compound while releasing hydrogen and while releasing heat of reaction, and, collecting a water stream from the main processor through reverse osmosis media that is pressurized due to the internal pressurization inside the main processor. Whereby the water stream that is collected past the reverse osmosis media is fresher than the inputted salt rich undrinkable water.

20 Claims, 6 Drawing Sheets

(56) References Cited

U.S. PATENT DOCUMENTS

| | | | |
|---|---|---|---|
| 6,184,432 B1 | 2/2001 | Thomas | 588/316 |
| 6,187,202 B1 * | 2/2001 | Fish | B01D 61/06 204/157.5 |
| 6,322,723 B1 | 11/2001 | Thomas | 252/188.25 |
| 6,936,354 B2 | 8/2005 | Ferrario et al. | 428/686 |
| 8,062,528 B2 | 11/2011 | Back et al. | 210/652 |
| 2009/0218225 A1 * | 9/2009 | Stefanini | B01D 61/025 204/571 |
| 2013/0228469 A1 | 9/2013 | Ito et al. | 205/370 |
| 2013/0316196 A1 * | 11/2013 | Mccluskey | H01M 8/065 429/9 |
| 2015/0298998 A1 * | 10/2015 | Legzdins | C02F 1/46104 205/748 |

* cited by examiner

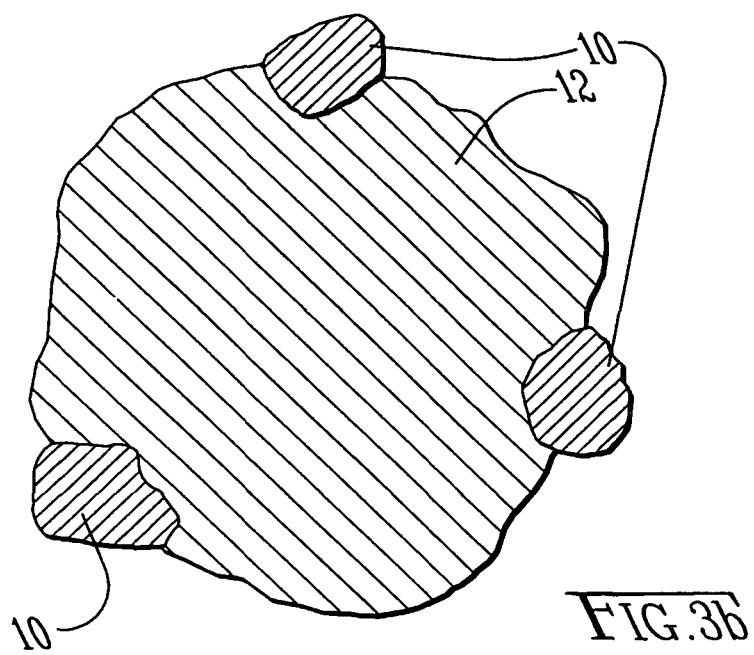

METHOD OF PRODUCTION OF FRESH WATER

CROSS-REFERENCE TO PROVISIONAL APPLICATION(S)

This application claims the benefit of U.S. Provisional Application No. 61/973,056, filed Mar. 31, 2014, and U.S. Provisional Application No. 62/009,625, filed Jun. 9, 2014. The foregoing patent disclosures are incorporated herein by this reference thereto.

BACKGROUND AND SUMMARY OF THE INVENTION

This invention relates to the chemistry of inorganic compounds and, more particularly, to reacting aqueous solutions with metals (or compounds) thereof for the production of fresh 'potable' water, or else, at least the mitigation in part of the contaminants in industrial waste streams and the like contaminated water.

It is an object of the invention to utilize the properties of micro-galvanic couples in aqueous solutions for the production of fresh or 'potable' drinking water. Micro-galvanic couples are mechanically alloyed metals (typically, a pair of such metals) that are relatively far apart from each other on the electrochemical series. Mechanical alloying may by accomplished by repeatedly flattening, fracturing and cold welding metal powders in ball mills or hammer mills or the like, and typically within inert atmospheres.

It is an aspect of the invention that the preferred galvanic cell (ie., an aluminum-iron, Al—Fe) galvanic cell that preferably contains Iron (Fe) to about the five mole percent relative to ninety-five mole percent of Aluminum (Al) can produce in excess of 2,000 times (two-thousand times) its weight in fresh potable water. More accurately, it is calculated that one pound (1 lb.) of such Al—Fe galvanic cells can produce two-thousand ninety-eight pounds (2,098 lbs.) of fresh potable water (eg., ~250 gallons) by the methods in accordance with the invention.

Or in other words, one pound (1 lb.) of Al—Fe galvanic cells can produce, by the methods in accordance with the invention, about one (1) cubic meter of fresh potable water.

A number of additional features and objects will be apparent in connection with the following discussion of the preferred embodiments and examples with reference to the drawings.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings.

FIG. 2 is a block diagram showing the processes of cleaning, sizing, mixing and matching the metals for the method (A) of production of fresh water in accordance with the invention, wherein circle (I.) in this FIG. 2 connects with circle (I.) in FIG. 3A;

FIG. 3A is a block diagram showing the processes of re-cleaning and milling the selected and sized metals into galvanic cells for the method of production of fresh water in accordance with the invention; wherein the processes shown in FIGS. 2, 3A, 4 and 5 hereof are powered in part by electric power generated by the produced hydrogen (C) (indicated in FIGS. 5, 6 and 7), filtered air and electrochemical fuel cells in accordance with the invention shown in FIG. 5, and wherein circle (II.) in this FIG. 3A connects with circle (II.) in FIG. 4;

FIG. 3B is an enlarged-scale cross-sectional view of a micro-galvanic couple particle in accordance with the invention;

FIG. 4 is a block diagram showing a main processor for the method of production of fresh water in accordance with the invention, wherein the galvanic cells shown by FIG. 3B are reacted with seawater within said main processor, and said reaction produces substantial pressure and temperature due to the release of hydrogen and heat of the reaction, and which temperatures and pressures force water through a reverse osmosis membrane in the processor (producing potable water), and wherein circle (III.) in this FIG. 4 connects with circle (III.) in FIG. 6;

FIG. 6 is a block diagram showing the processes of diverting the output of the main processor in accordance with the invention and as shown by FIG. 5, into four streams, namely, potable water, "less active" (ea., magnetic) metals, a slurry of other liquids & particulate, and, hydrogen— wherein the liquid & particulate stream is used as feed stock for the chemical industries and the "less active" (eg., magnetic) metals (B) are returned to making galvanic couples and the post-consumer metal recycling stream, and the hydrogen (C) will be subject to further processes as shown next in FIG. 7; and FIG. 7 is a block diagram showing the hydrogen (C) produced by the main processor shown in FIG. 4 or 5, the hydrogen gas is reacted with filtered air in electrochemical fuel cells thereby producing additional potable water and concurrently producing electricity.

DETAILED DESCRIPTION OF THE PREFERRED EMBODIMENTS

Figure 2:
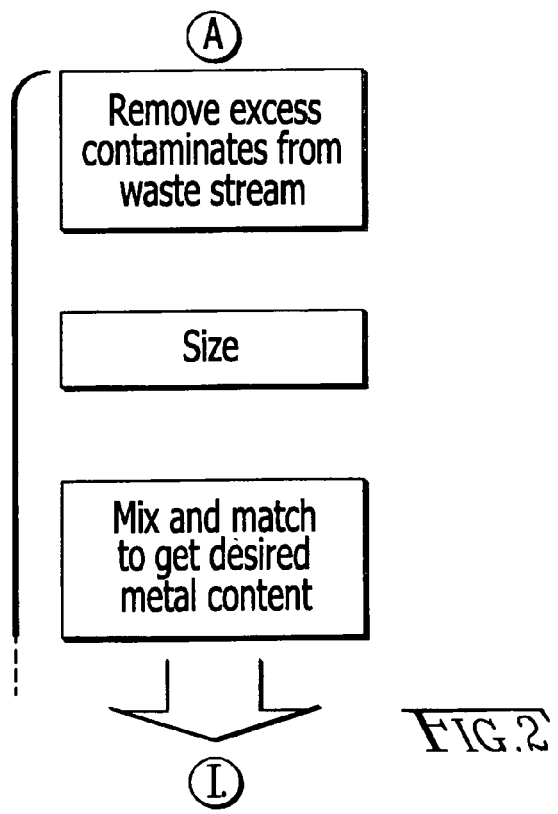
FIGS. 2, 3A, 4 and 6-7 comprise a series of block diagrams showing a method (A) of production of fresh water in accordance with the invention, wherein:—
Figure 3A:
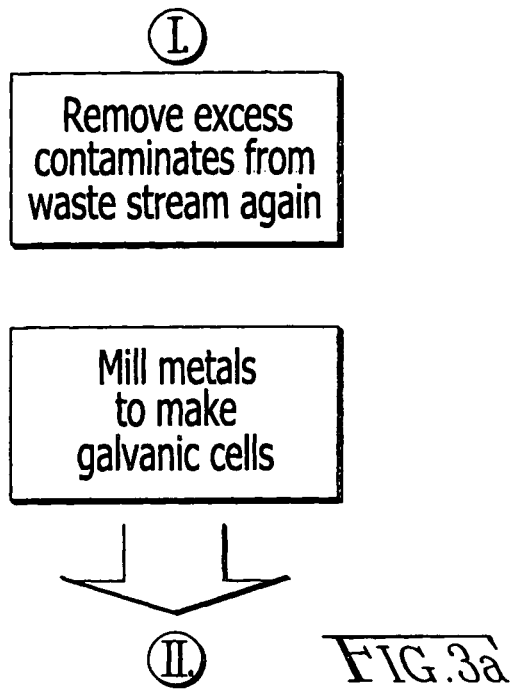

FIGS. 2, 3A and 4-7 show a method (A) (indicated in FIGS. 2 and 5) in accordance with the invention for producing fresh 'potable' water by mixing galvanic couples (10,12) as shown by and without limitation FIG. 3B, with salt rich undrinkable water including preferably but without limitation seawater and or petroleum production water.

FIG. 3B shows a preferred micro-galvanic couple particle (10,12) that is utilized in accordance with the invention to convert salt rich undrinkable water into drinkable freshwater.

This micro-galvanic couple particle (10,12) is produced by mechanical alloying (cold welding) powders of two dissimilar metals (eg., 10 and 12) or alloys that are relatively far apart on the electrochemical series. Typically this mechanical alloying or cold welding is done in ball mills or hammer mills in inert atmospheres. Literally, the particles are just hammered or beat into these micro-cells (galvanic couples).

Typically the micro-cell (galvanic couple) is formed by combining (1) a "more active" electrically conductive metal 12 with (2) a "less active" electrically conductive material 10.

Suitable "more active" electrically conductive material particles 12 include without limitation metals such as Mg Magnesium, Al Aluminum, Al alloys, Mg alloys or combinations thereof.

Suitable "less active" electrically conductive material particles 10 include without limitation metals such Fe Iron, Ni Nickel, Co Cobalt, Sn Tin, Pb Lead, Ti Titanium, Cu Copper, Cr Chromium, C Carbon or combinations thereof.

Alternatively, other suitable "more active" electrically conductive material particles 12 include without limitation metals such as Mg Magnesium, Al Aluminum, Zn Zinc, Ca Calcium, Na Sodium, K Potassium, Li Lithium, or Fe iron.

And correspondingly, alternative other suitable "less active" electrically conductive material particles 12 include without limitation metals such as Fe Iron, Ni Nickel, Co Cobalt, Sn Tin, Pb Lead, Ti Titanium, Cu Copper, Ru Ruthenium, Pd Palladium, Pt Platinum, Ag Silver, Au Gold, or C Carbon.

In the instance of Fe Iron appearing as both an option as a "less active" metal and "more active" metal on the second set of lists, Fe Iron would not be paired with itself. In the role of the "less active" metal, it is preferred to pair Iron (or any of its alloys) with Al Aluminum or Mg Magnesium (and/or any of their alloys). In the role of the "more active" metal, it is preferred to pair Iron (or any of its alloys) with Ag Silver or Ru Ruthenium (and/or any of their alloys).

A preferred embodiment of such a micro-galvanic cell is preferably composed of Aluminum (12) and Iron (10). This Al—Fe galvanic cell preferably contains Iron (Fe) to about the five mole percent relative to ninety-five mole percent of Aluminum (Al).

It is an object of the invention to keep the costs down for the method (A) (indicated in FIGS. 2 and 5) of production of fresh water in accordance with the invention to as manageable low cost as practical.

It is notable that Iron (Fe) and Aluminum (Al) are both very abundant in the consumer waste streams. Whereas perhaps it would be ideal to be able to utilize the more expensive materials in their most pure refined conditions, the economics of the process suggest that it is preferred in accordance with the invention to look elsewhere. That is, it is preferred to utilize an abundant waste stream as opposed to materials which would have to be diverted from other uses:—unless the criticality for the water freshening aspects in accordance with the invention cost justified the use of more expensive materials.

It is preferred without limitation to select Iron (including without limitation steels and its alloys) in combination with Aluminum or its alloys to make micro-galvanic cells of Al—Fe for the method (A) (indicated in FIGS. 2 and 5) of the production of fresh water in accordance with the invention.

In other words, the galvanic couples are produced from low value metallic scrap and or waste, and, thereafter made to change seawater and production water into fresh water.

The method (A) (indicated in FIGS. 2 and 5) in general is characterized by the following equations (eg., for Al—Fe micro-galvanic cells in particular):

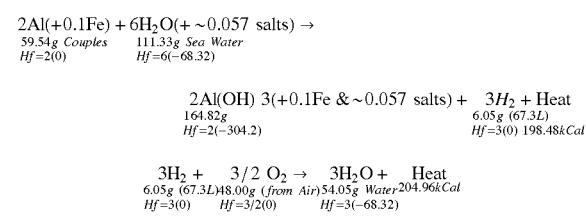

Figure 5:
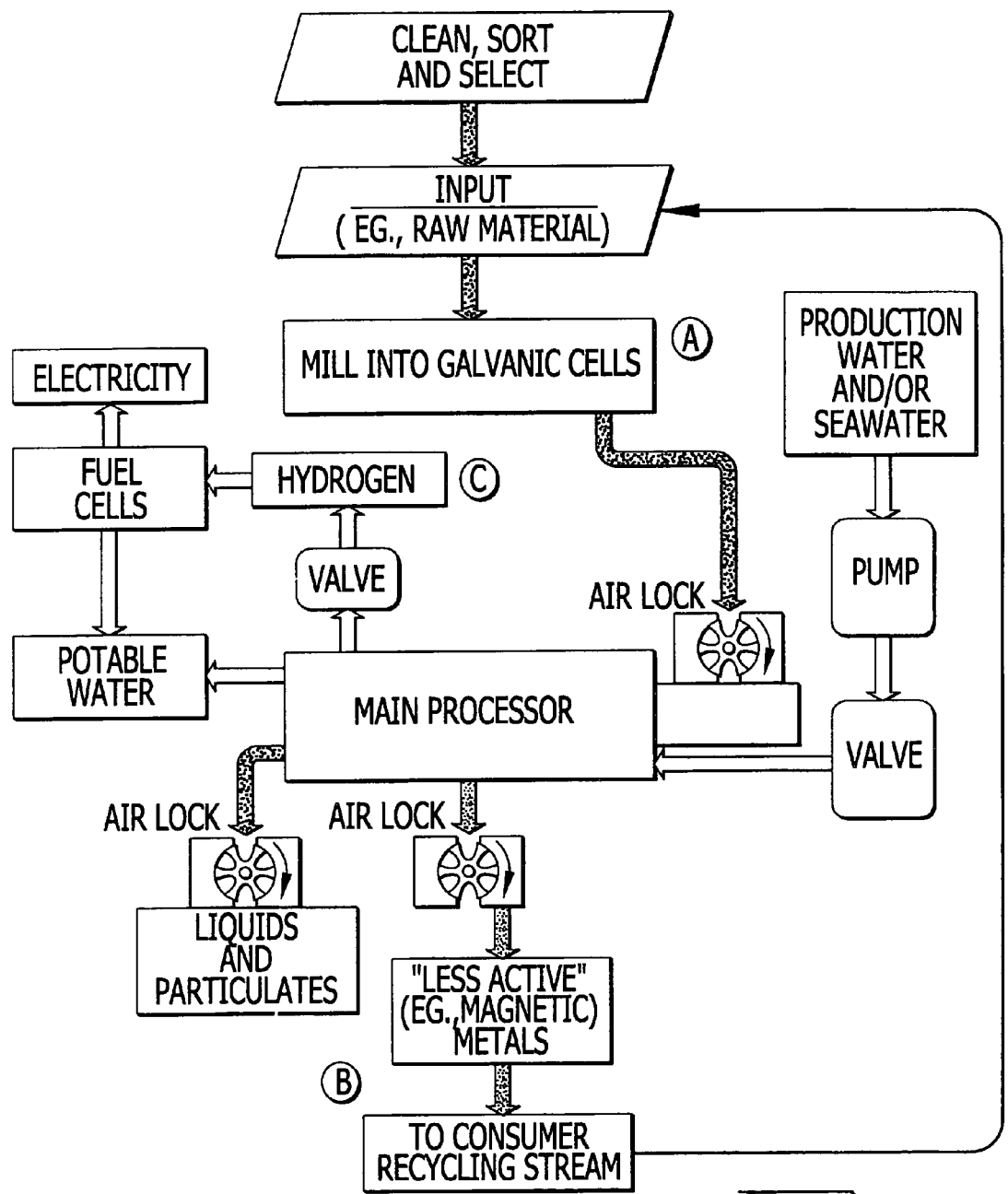
FIG. 5 is—not a block diagram but—a schematic diagram of the main processor producing hydrogen (C) from the reaction of the galvanic cells and seawater for the method (A) of production of fresh water in accordance with the invention, in which the reaction produces a substantial pressure and temperatures due to the release of hydrogen and heat of the reaction, and which temperatures and pressures force water through a reverse osmosis membrane in the processor, and which results in a liquid & particulate stream that can be used as feed stock for the commercial chemical industries and the "less active (eg., magnetic in the case of the "less active" material being Iron) metals (B) that can be returned to making galvanic couples and or the post-consumer metal recycling stream.
Figure 6:
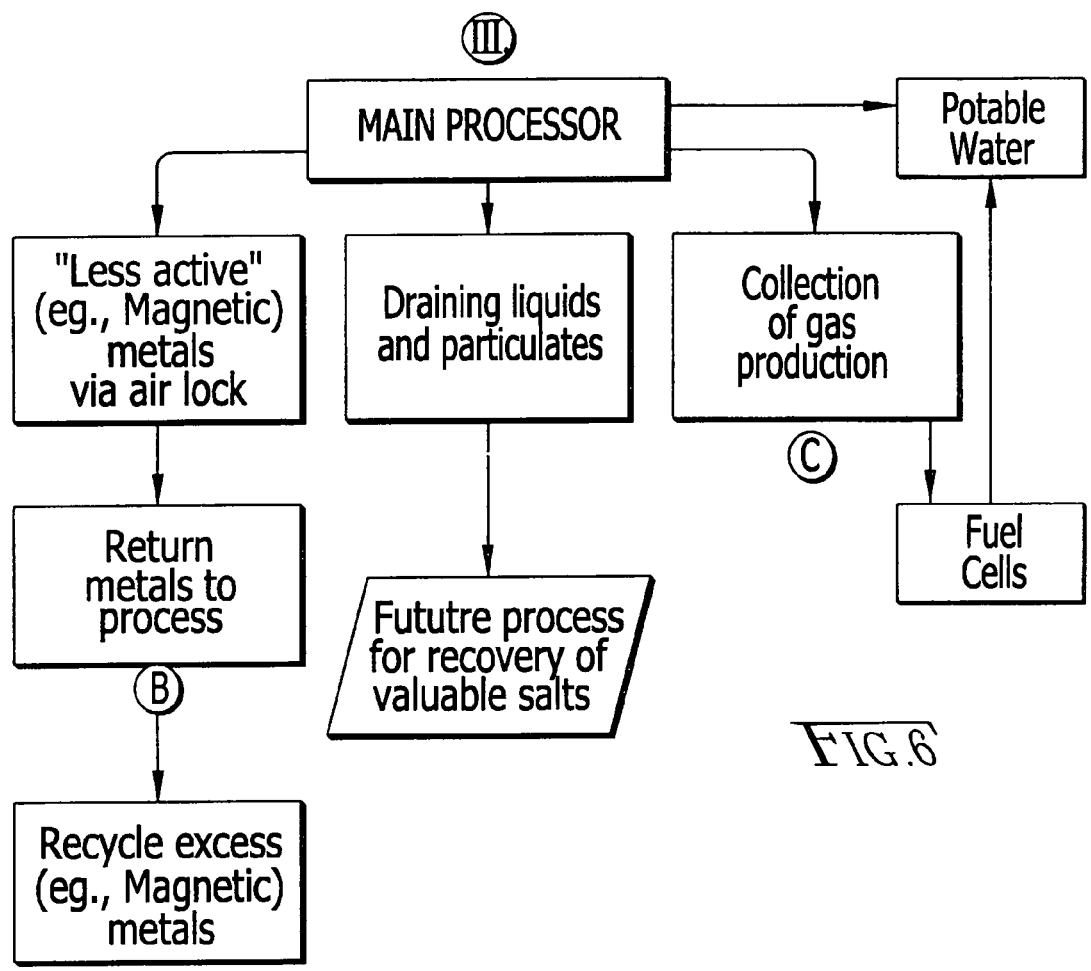

It is an object of the invention to produce the foregoing from the invention, namely, (1) substantial pressure in the main processor to drive reverse osmosis,
(2) potable water from the reverse osmosis of sea or salt rich waste water,
(3) hydrogen (C) (indicated in FIGS. 5, 6 and 7) and or electrical power, and
(4) a recycle/source stream of used metals (B) (as indicated in FIGS. 5 and 6) and feed stock for the chemical industry.

Figure 1:
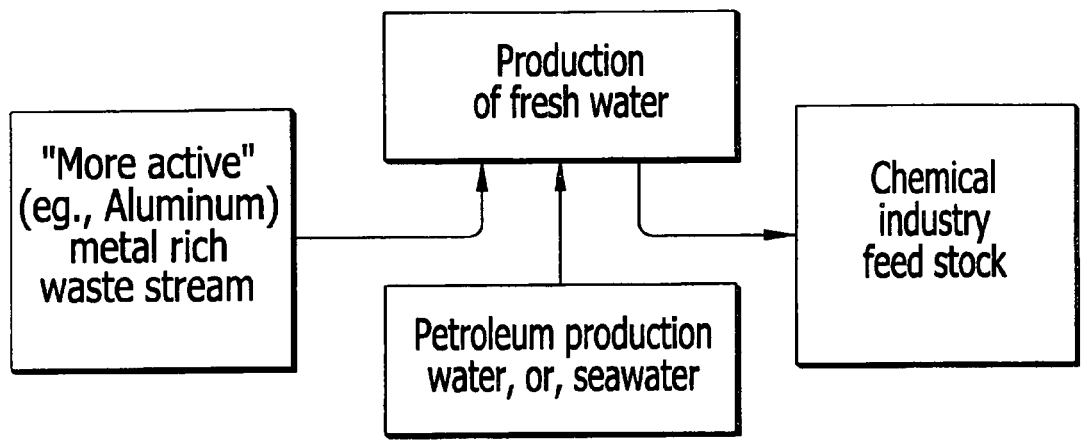
FIG. 1 is a block diagram showing a process in accordance with the invention for the diversion of available metallic waste streams to a method (A) (indicated in FIGS. 2 and 5) of production of fresh water in accordance with the invention, but after when the metals have been utilized by the method (A), the reaction products of such metals can be used as feed stock by the chemical industry and partially be returned to a metallic recycle stream.

FIG. 1 is a block diagram showing a process in accordance with the invention for diversion of available metallic waste streams to a method (A) (indicated in FIGS. 2 and 5) of production of fresh water in accordance with the invention. After the metals have been utilized by the method (A), the reaction products of such metals can be used as feed stock by the chemical industry and partially be returned to the commercial metal recycle stream (eg., magnetic metals if Fe Iron is the lesser active conductor material.

Aluminum is the most preferred active conductive material because the method (A) works satisfactorily with heavily contaminated grade scrap/waste Aluminum and alloys that have not found an economical use, and aluminum is among the most reactive of the "more reactive" materials.

FIGS. 2, 3A, 4 and 6-7 comprise a series of block diagrams showing a method (A) (indicated in FIGS. 2 and 5) of production of fresh water in accordance with the invention, as follows.

FIG. 2 is a block diagram showing the processes of cleaning, sizing, mixing and matching the metals for the method (A) (indicated in FIGS. 2 and 5) of production of fresh water in accordance with the invention. In other words, waste metal is inputted to these processes, which cleans, sizes the preferred metals (ie., iron, nickel, aluminum) into preferred particle sizes and mixes, and, matches waste metals to optimize the process.

FIG. 3A is a block diagram showing the processes of re-cleaning and milling the selected and sized metals into galvanic cells for the method (A) (indicated in FIGS. 2 and 5) of production of fresh water in accordance with the invention. The use of waste metal will require processes to reduce dirt, corrosion products and/or other coatings. To produce the couples (cells), preferably a commercial-quality ball mill or other milling device(s) (with or without an inert atmosphere) will be necessary to produce satisfactory galvanic couples (cells). FIG. 3B gives an idea what these micro-galvanic couples (cells) look like, eg., approximately five mole percent of Iron (Fe) relative to ninety-five mole percent of Aluminum (Al).

The processes shown in FIGS. 2, 3A, 4 & 5 hereof are powered in part by electric power generated by hydrogen (C) (indicated in FIGS. 5, 6 and 7) and filtered air reacting in electrochemical fuel cells.

Figure 4:
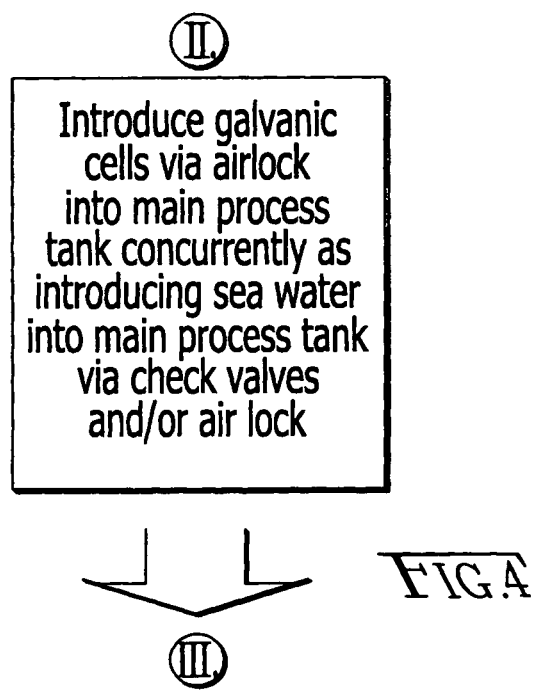

FIG. 4 is a block diagram showing a main processor for the method of production of fresh water in accordance with the invention. Presumptively, the main processor comprises a steel or stainless tank for operating at relatively high pressures and also able to withstand relatively high temperatures. The galvanic cells shown by FIG. 3B are reacted with seawater (or briny or otherwise contaminated water) in this main processor. The reaction produces substantial pressures and temperatures due to release of hydrogen and heat of the reaction. The build-up of internal pressurization inside the main processor due to the hot pressurized reaction products forces water through a reverse osmosis membrane in the processor to produce potable water—or at least to mitigate some of the saltiness or other compromising aspects of the source water.

FIG. 5 is—not a block diagram but—a schematic diagram of the main processor producing hydrogen (C) from the reaction of the galvanic cells and seawater for the method (A) (indicated in FIGS. 2 and 5) of production of fresh water in accordance with the invention. The reaction produces substantial pressures and temperatures due to the release of hydrogen the heat of the reaction, which hot pressurized reaction products force water through a reverse osmosis membrane in the processor. As a result, the main processor produces hydrogen, potable water, an other-liquid & particulate stream that can be used as feed stock for the chemical industries, and, perhaps return of the "less active" conductor materials (B) (eg., magnetic metals if Fe Iron is the "less active" material) that are returned to making galvanic couples and/or sent to a post-consumer metal recycling stream.

FIG. 6 is a block diagram showing the processes of diverting the output of the main processor in accordance with the invention and as shown by FIG. 5, into four streams, namely,
  metals (B),
  liquids and particulate
  hydrogen (C), and
  potable water.

The metals (B) are reused to make galvanic couples and the excess is sent to the post-consumer metal recycling stream. The hydrogen (C) will be subject to further processes as shown next in FIG. 7.

Figure 7:
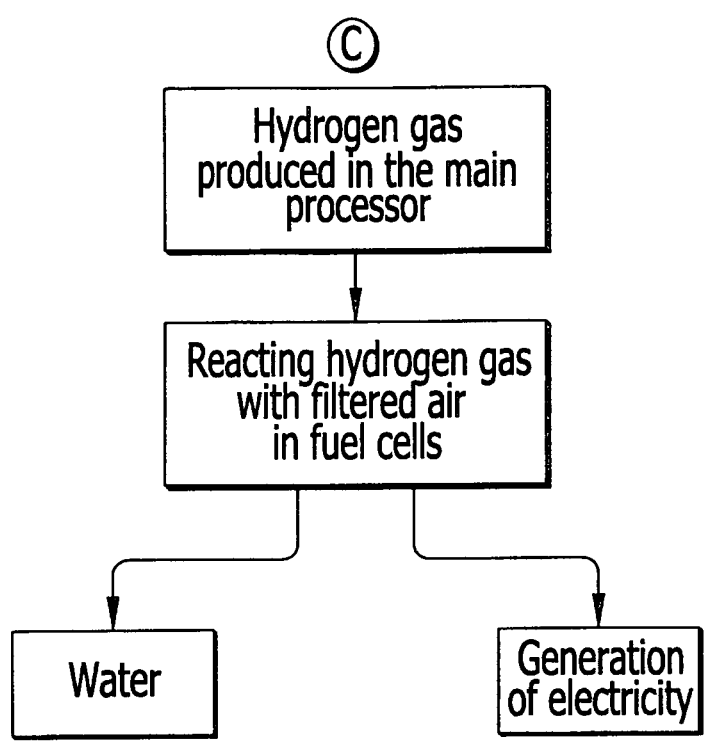

FIG. 7 is a block diagram showing the processes of collecting the hydrogen gas (C) produced by the main processor shown in FIG. 5 and using it to produce electricity and more potable water. Preferably the hydrogen is reacted with filtered air in fuel cells. The output here comprises electric generation, and, water. In fact, the water produced here is too pure to drink. It is believed if the water output in FIG. 7 is mixed with the water output from the main processor in FIG. 5 or 6, the mixture will be satisfactory for as potable water.

It is ideal to use seawater or petroleum production water for the method (A) (indicated in FIGS. 2 and 5) in accordance with the invention because of their availability and salt content. Seawater is as abundant as the oceans. Petroleum production water is both abundant and a troubling waste stream.

Ideally, the only gas outputted in stream (C) (indicated in FIGS. 5, 6 and 7) is hydrogen. However, since (in accordance with one preference of the invention) scrap materials are being used to the produce the galvanic cells, and/or, since the input undrinkable water may have reactants in it that may make other gasses, there is optimally an optional attempt to isolate the hydrogen gas. It is believed easy to identify the non-hydrogen gas product.

To return to FIG. 5, it shows that the hydrogen output (C) is collected from a valve on the output end of the main processor. Hydrogen might alternatively be collected escaping out the air lock which introduces the micro-galvanic cells into the main processor. The air lock is likely to have the loosest seals for the hydrogen to work its way out of the main processor. The valve at (C) might be alternatively be useful for venting steam and other gasses. The steam (water vapor) can be cooled into water condensate, which further can be added to the output stream of fresh or freshened water.

Even though the galvanic cells are preferably produced from a stream of scrap materials, such materials are preferably procured in bulk and preferably de-oxidized or otherwise conditioned such that the realm of possible reaction formulas is fairly well confined to a handful. Additionally, it is preferred in accordance with the invention if the source undrinkable water is selected so that the properties and composition of the source undrinkable water is preferably fairly well narrowed down and well understood.

It is ideal to use seawater for the method (A) (indicated in FIGS. 2 and 5) in accordance with the invention. Seawater is as abundant as the oceans, needless to say, and the properties in any one local are fairly uniform as long as remote from where large rivers flow in.

Given the foregoing, if there are any unwanted gasses in the stream (C) (indicated in FIGS. 5, 6 and 7) produced by the main processor, there are available means to reduce and/or eliminate them including gettering, diffusion, buoyancy (eg., let hydrogen float up and heavier gasses sink) and so on.

The preferably and optimally isolated hydrogen is reacted with filtered air thereby producing water vapor (H) (indicated in FIG. 9) and concurrently releasing a high heat-production value (E) (indicated in FIG. 8) for energy utilization as shown next in FIG. 8. Another way to reckon "reacting" hydrogen and oxygen is to refer to it as "combustion."

Whereas the method (A) (indicated in FIGS. 2 and 5) in accordance with the invention has largely been described in connection with the production of fresh potable water, it could readily be utilized in the alternative to de-contaminate—at least in part—contaminated water streams such as an without limitation petroleum production water and so on.

Moreover, whereas the method (A) (indicated in FIGS. 2 and 5) in accordance with the invention has largely been described in connection with micro-galvanic cells produced from streams of economic/scrap materials, the method of freshening salt rich undrinkable water in accordance with the invention could also be accomplished by using an economic "more active" metal—like most prominently Fe Iron—in combination with a relatively expensive "less active" metal:—so long as the "less active" metal is suitably distanced from Fe Iron on the electrochemical series.

The proposition of using 'relatively' expensive "less active" metals shouldn't offend any notions of conservation too bad because, the "less active" metal can generally be retrieved and recycled. Where freshening water is a priority, two good quality metals for serving in the "less active" role include—both because of their position in the electrochemical series relative to Fe Iron and because of their relative affordability—include without limitation Ru Ruthenium (ie., the most affordable member of the Platinum series) and Ag Silver.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

What is claimed is:

1. A method of freshening salt rich undrinkable water, comprising the steps of:
   introducing galvanic couple particles to salt rich undrinkable water inside a main processor;
   controlling pressure inside the main processor such that the internal pressurization builds to a selected level due to the reaction of the salt rich undrinkable water with the galvanic couple particles into a metallic compound while releasing hydrogen and while releasing heat of reaction;
   collecting a water stream from the main processor through reverse osmosis media whereby the water stream is forced therethrough due to the selected level of internal pressurization inside the main processor, and, whereby the water stream collected past the reverse osmosis media is fresher than the inputted salt rich undrinkable water.

2. The method of claim 1, further comprising:
   collecting a stream of hydrogen gas from the main processor;
   reacting the collected stream of hydrogen gas with oxygen to form a stream of fresh water; and
   adding this stream of fresh water to the freshened stream of water collected past the reverse osmosis media.

3. The method of claim 2, wherein:
   the step of reacting the collected stream of hydrogen gas with oxygen further comprises, doing so in an electrochemical fuel cell, and generating electric power as a result thereof.

4. The method of claim 2, further comprising the step(s) of:
   collecting water vapor out of the main processor;
   condensing the collected water vapor into water condensate; and
   adding the water condensate to the freshened stream of water collected past the reverse osmosis media.

5. The method of claim 2, wherein:
   before the step of collecting the water stream from the main processor through reverse osmosis media, selecting a reverse osmosis membrane such that adding the stream of freshened water collected past the reverse osmosis membrane, to, the stream of fresh water from the collected hydrogen reacted with oxygen, results in a combined stream of water which is potable.

6. The method of claim 1, wherein:
   before the step of collecting the water stream from the main processor through reverse osmosis media, selecting a reverse osmosis membrane such that the stream of freshened water collected past the reverse osmosis membrane is potable.

7. The method of claim 1, wherein:
   said galvanic couple particle comprises a composite of a less active conductor material particle and a more active conductor material particle.

8. The method of claim 7, wherein:
   said more active conductor material particle comprises any of Mg Magnesium, Al Aluminum, Al alloys, Mg alloys or combinations thereof.

9. The method of claim 8, wherein:
   said less active conductor material particle comprises Fe Iron, Fe alloys or combinations thereof.

10. The method of claim 8, wherein:
    said less active conductor material particle comprises any of Fe Iron, Ni Nickel, Co Cobalt, Sn Tin, Pb Lead, Ti Titanium, Cu Copper, Ru Ruthenium, Pd Palladium, Pt Platinum, Ag Silver, Au Gold, or C Carbon.

11. The method of claim 7, wherein:
    said more active conductor material particle comprises any of Mg Magnesium, Al Aluminum, Zn Zinc, Ca Calcium, Na Sodium, K Potassium, or Li Lithium.

12. The method of claim 11, wherein:
    said less active conductor material particle comprises any of Fe Iron, Ni Nickel, Co Cobalt, Sn Tin, Pb Lead, Ti Titanium, Cu Copper, Ru Ruthenium, Pd Palladium, Pt Platinum, Ag Silver, Au Gold, or C Carbon.

13. The method of claim 7, wherein:
    said more active conductor material particle comprises any of Fe Iron, Fe alloys or combinations thereof; and
    said less active conductor material particle comprises any of Ru Ruthenium or Ag Silver.

14. The method of claim 1, wherein:
    the step of introducing galvanic couple particles to salt rich undrinkable water inside a main processor further comprises:
      continuously inputting a flow of the salt rich undrinkable water into the main processor while maintaining control over internal pressurization; and
      continuously inputting a flow of the galvanic couple particles into main processor to be submerged in the salt rich undrinkable water while maintaining control over internal pressurization; and
    the step of collecting a water stream from the main processor through reverse osmosis media further comprises:
      continuously collecting said water stream from the main processor past the reverse osmosis media while maintaining control over internal pressurization.

15. The method of claim 14, further comprising the step(s) of:
    continuously collecting a stream of hydrogen from the main processor while maintaining control over internal pressurization; and
    reacting the collected stream of hydrogen gas with oxygen to form a stream of fresh water; and
    adding this stream of fresh water to the freshened stream of water collected past the reverse osmosis media.

16. The method of claim 15, wherein:
    the step of reacting the collected stream of hydrogen gas with oxygen further comprises, doing so in an electrochemical fuel cell, and generating electric power as a result thereof.

17. The method of claim 15, further comprising the step(s) of:
    collecting water vapor out of the main processor while maintaining control over internal pressurization;
    condensing the collected water vapor into water condensate; and adding the water condensate to the freshened stream of water collected past the reverse osmosis media.

18. The method of claim 15, wherein:

before the step of collecting the water stream from the main processor through reverse osmosis media, selecting a reverse osmosis membrane such that adding the stream of freshened water collected past the reverse osmosis membrane, to, the stream of fresh water from the collected hydrogen reacted with oxygen, results in a combined stream of water which is potable.

19. The method of claim 14, further comprising the step of:

continuously draining the main processor of liquids and particulates while maintaining control over internal pressurization.

20. The method of claim 14, wherein:

the step of continuously inputting a flow of the galvanic couple particles into main processor further comprises, doing so by an air lock.

\* \* \* \* \*